US011910120B2

(12) United States Patent
Pandey et al.

(10) Patent No.: US 11,910,120 B2
(45) Date of Patent: Feb. 20, 2024

(54) VISUAL EXPERIENCE MODULATION BASED ON STROBOSCOPIC EFFECT

(71) Applicant: International Business Machines Corporation, Armonk, NY (US)

(72) Inventors: Diwesh Pandey, Bangalore (IN); Tathagato Bose, Kolkata (IN); Smitkumar Narotambhai Marvaniya, Bangalore (IN); Arun Joseph, Bangalore (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 76 days.

(21) Appl. No.: 17/524,088

(22) Filed: Nov. 11, 2021

(65) Prior Publication Data
US 2023/0147659 A1 May 11, 2023

(51) Int. Cl.
| H04N 5/262 | (2006.01) |
| G06N 20/20 | (2019.01) |
| G06V 20/20 | (2022.01) |
| H04N 5/76 | (2006.01) |
| H04N 9/79 | (2006.01) |

(52) U.S. Cl.
CPC ......... *H04N 5/2625* (2013.01); *G06N 20/20* (2019.01); *G06V 20/20* (2022.01); *H04N 5/76* (2013.01); *H04N 9/79* (2013.01)

(58) Field of Classification Search
CPC ......... H04N 5/2625; H04N 5/76; H04N 9/79; G06N 20/20; G06V 20/20
See application file for complete search history.

(56) References Cited

U.S. PATENT DOCUMENTS

| 8,866,702 B1 * | 10/2014 | Wong ..................... G06F 3/013 345/9 |
| 9,367,908 B1 | 6/2016 | Bekey |
| 9,595,295 B1 | 3/2017 | Bekey |
| 9,677,840 B2 | 6/2017 | Rublowsky |
| 2006/0182357 A1 * | 8/2006 | Liu ......................... G06V 20/52 382/239 |
| 2011/0242334 A1 * | 10/2011 | Wilburn .................. H04N 9/75 348/222.1 |
| 2017/0132841 A1 * | 5/2017 | Morrison ............... G06V 20/20 |
| 2019/0278091 A1 * | 9/2019 | Smits .................... H04N 13/363 |

(Continued)

FOREIGN PATENT DOCUMENTS

CN          105280104 B          9/2020

OTHER PUBLICATIONS

Akae et al., "Video from Nearly Still: An Application to Low Frame-rate Gait Recognition", 2012 IEEE Conference on Computer Vision and Pattern Recognition, pp. 1537-1543.

(Continued)

*Primary Examiner* — Sunghyoun Park
(74) *Attorney, Agent, or Firm* — Monchai Chuaychoo (57) ABSTRACT

An approach for modifying in real-time by removing or reinforcing stroboscopic effect from images associated with a viewing experience is disclosed. The approach includes identifying video clips, detecting environmental parameters and calculating display setting. The approach also analyzes display setting using recommendation from GAN, output displaying setting on an AR display and receiving feedback from user.

20 Claims, 6 Drawing Sheets

(56) References Cited

U.S. PATENT DOCUMENTS

| | | | |
|---|---|---|---|
| 2020/0021718 A1* | 1/2020 | Barbu | A61B 5/7267 |
| 2020/0342268 A1* | 10/2020 | Chen | G06N 3/08 |
| 2021/0174072 A1* | 6/2021 | Zhang | G06V 40/165 |
| 2021/0242779 A1* | 8/2021 | Cheng | H02M 3/158 |

OTHER PUBLICATIONS

International Search Report and Written Opinion, International Application No. PCT/EP2022/079689, International Filing Date Oct. 25, 2022.

* cited by examiner

VISUAL EXPERIENCE MODULATION BASED ON STROBOSCOPIC EFFECT

BACKGROUND

The present invention relates generally to the field of display and more particularly to adjusting stroboscope effect on viewing experience.

The optical phenomenon of stroboscopic effect causes moving objects to appear stationary when seen in a non-continuous and discrete sampling view. The effect is not same in all the people and it depends on their physiological conditions, geographical location, etc.

In real life, due to the presence of stroboscopic effect comprehensibility of a display scene may get better or even poorer too. On the other hand, removal of stroboscopic effect may also elevate the experience. In pre-recorded videos (e.g., movies or camera captures), due to difference between rotation frequency of wheel and frequency of light, wagon wheel effects get introduced unintentionally and worsens the experience. Most of the times, it's better to omit the optical illusion, but at times, in a few specific scenarios absence of optical illusions makes us uncomfortable and requires enhancement.

SUMMARY

Aspects of the present invention disclose a computer-implemented method, a computer system and computer program product for modifying in real-time by removing or reinforcing stroboscopic effect from images associated with a viewing experience. The computer implemented method may be implemented by one or more computer processors and may include, identifying video clips; detecting environmental parameters; calculating display setting; analyzing display setting using recommendation from GAN; outputting displaying setting on an AR display; and receiving feedback from user.

According to another embodiment of the present invention, there is provided a computer system. The computer system comprises a processing unit; and a memory coupled to the processing unit and storing instructions thereon. The instructions, when executed by the processing unit, perform acts of the method according to the embodiment of the present invention.

According to a yet further embodiment of the present invention, there is provided a computer program product being tangibly stored on a non-transient machine-readable medium and comprising machine-executable instructions. The instructions, when executed on a device, cause the device to perform acts of the method according to the embodiment of the present invention.

BRIEF DESCRIPTION OF THE DRAWINGS

Preferred embodiments of the present invention will now be described, by way of example only, with reference to the following drawings, in which.

DETAILED DESCRIPTION

The current state of art as it pertains video display, specifically with stroboscopic effect associated with moving objects can present some challenges for viewers. For example, a scene from a video image may demand the background to be visible, omitting the stroboscopic effect of the moving object. If not corrected, it may also be undesirable effect, such as in the medical field, there can be a possible lesion/tumor that was blocked from view off the X-ray chart. Contrarily, it might be desirable to make the moving object opaque by blocking the background visibility completely.

Other challenges associated with the consequences of the stroboscopic effect can include the following examples, in video clips with stroboscopic effect, significance prioritization of the moving object and the background becomes difficult if the whole context is not considered. In another example related to capturing videos, absence of obvious stroboscopic effects, of which our brain is regularly trained, can make the whole viewing experience dull.

Embodiments of the present invention recognizes the deficiencies in the current state of art as it relates to stroboscopic effect associated with moving objects and provides an approach. The approach comprises of a correction in real-time by removing or reinforcing stroboscopic effect associated with a viewing experience. The approach leverages AR (augmented reality) and uses machine learning, specifically, generative adversarial network (GAN) to modify/correct the images in real-time. The approach can also be applied to pre-recorded videos to get the portion of specific frames corrected. The approach can be deployable, downloadable, and shareable model. Furthermore, the approach can be integrated into a system that can be developed and updated on top of a user interface (UI).

Embodiments of the present invention can be advantages in the following scenarios: (i) industries where fatal accidents may happen due to stroboscopic effect, where moving blades becoming invisible (i.e., scenarios where the background becomes more important to be visible then the moving object), (ii) videos or commercial ads where the wagon wheel effect distorts the viewing experience by showing what is not feasible. Or another wagon wheel effect that seems to show the wheel moving in a backward direction, (iii) various application on computer vision using AI for accurate image representation, (iv) in Medical Imaging Analytics and Solutions with is a focused research domain for healthcare, Informatics, etc. and (v) can be very useful for AR experiences where user is mostly depended on their visual stimulations.

Some embodiments may include an approach that identifies context of scenes and modulating the visibility of moving object and background. The same embodiment may augment the background of the stroboscopic effect by creating object to be visible, which facilitates user to experience the moving object to be transparent.

Some embodiments may include an approach that allows for the moving object completely opaque to make the user aware of its presence (user will not get to see the background) and can enhance or rectify the existing stroboscopic effect for better viewing experience by avoiding scenarios like Wagon wheel effect where optical illusion make things contradict the physical properties.

Some embodiments may include the following features which is advantages to minimize the stereoscopic effect: (i) modulating visibility of moving objects and background simultaneously, (ii) augmenting the background and adding transparency, (iii) making the moving object opaque and distinguishing it with respect to the background, (iv) controlling of the stroboscopic effect using light source, but it is only applicable to a display device and does not work on the fly in real life scenario, (v) making the moving object opaque and distinguishing it with respect to the background, (vi) augmenting the background and adding transparency, (vii) changing the movement of the objects in the video, but this is done as a post processing step in the media file and not done on the fly (also doesn't consider the effect of the background).

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

It should be understood that the Figures are merely schematic and are not drawn to scale. It should also be understood that the same reference numerals are used throughout the Figures to indicate the same or similar parts.

Figure 1:
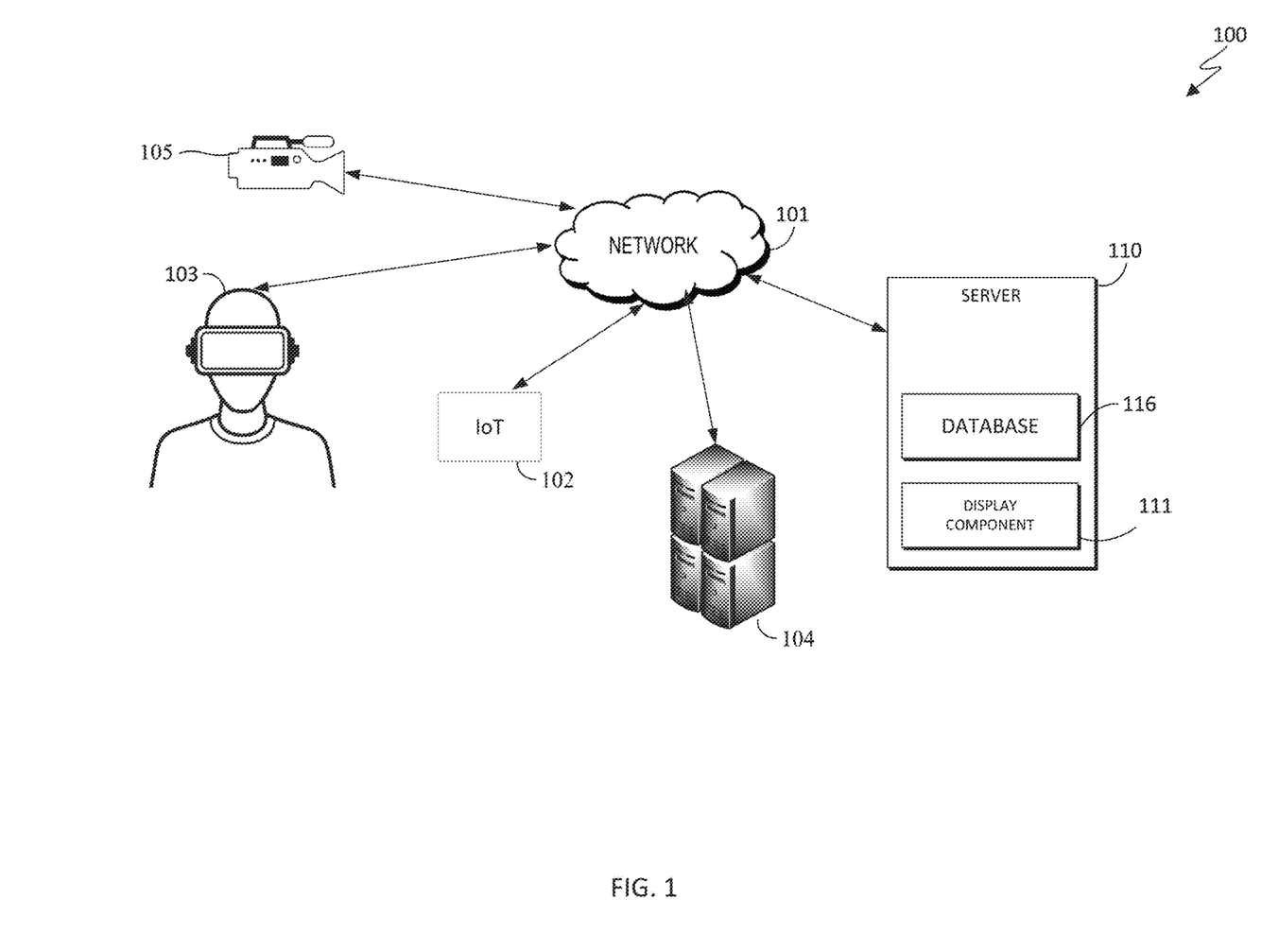
FIG. 1 is a functional block diagram illustrating a display environment, designated as 100, in accordance with an embodiment of the present invention.

FIG. 1 is a functional block diagram illustrating a display environment 100 in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Display environment 100 includes network 101, IoT devices 102, display devices 103, GAN(Generative Adversarial Network) server 104, video source 105 and server 110.

Network 101 can be, for example, a telecommunications network, a local area network (LAN), a wide area network (WAN), such as the Internet, or a combination of the three, and can include wired, wireless, or fiber optic connections. Network 101 can include one or more wired and/or wireless networks that are capable of receiving and transmitting data, voice, and/or video signals, including multimedia signals that include voice, data, and video information. In general, network 101 can be any combination of connections and protocols that can support communications between server 110, display devices 103, IoT devices 102, GAN server 104, video source 105 and other computing devices (not shown) within display environment 100. It is noted that other computing devices can include, but is not limited to, IoT devices 102 and any electromechanical devices capable of carrying out a series of computing instructions.

IoT devices 102 can be any smart/IoT (internet of things) device (e.g., wearable smart devices, smart phones, wireless camera, etc.) including various sensors (e.g., thermal sensors/imaging, heart rate monitor and microphones) that is capable of gathering real-time data (e.g., video images, temperature, humidity, etc.). For example, IoT devices 102 can collect personal user data along with environmental data. The user data can be related to the user's medical profile (using wearable sensors). The environmental data can be collected using light sensors, speed sensors, etc. which are mapped to environmental profile such lighting condition, frequency of light rotating speed of objects, etc.

Display devices 103 can be any display device that allows the users to view images that has been modified/corrected stroboscopic effect. Display devices 103 can be, but it is not limited to, LCD/LED display, VR (virtual reality) goggles, AR (augmented reality) goggles, projector and tablets.

GAN server 104 is an AI (artificial intelligence) server that leverages generative adversarial network (GAN) technology to perform image manipulation (e.g., edits, modifications, etc.).

What is GAN technology? It is a type of machine learning (e.g., supervised, unsupervised, reinforcement learning, etc.) that has vast applicability in model training. Given a training set, GAN technology can learn to generate new data with the same similar accuracy as the training set. The main idea of a GAN is based on the "indirect" training through the discriminator, wherein the discriminator itself is also being updated dynamically. This basically means that the generator is not trained to minimize the distance to a specific image, but rather to fool the discriminator. This enables the model to learn in an unsupervised manner. GAN uses two neural networks (e.g., generator, discriminator) in its architecture. The objective of the generator network is the creation of fake output then it takes random noise as input, and it produces output as similar as possible to real output. For example, if-a counterfeit money is used, the generator attempts to produce an output that looks like real money. Conversely, the discriminator network acts as the police. It is trained with real money images so that it has a good understanding of how real money should look. The fake images from the generator are also fed to the discriminator. Initially, it does not have any problems in distinguishing real from fake in the early part of the training. Furthermore, it also provides feedback to the generator of how good a job it is performing. Based on this feedback, the generator modifies its approach to produce (e.g., loss function, etc.) a more authentic output in the next iteration.

Video source 105 is the source of the video (e.g., still, computer file, moving, live, pre-recorded, etc.) that user wishes to modify due to the stroboscopic effect.

Server 110 and/or GAN server 104 can be a standalone computing device, a management server, a web server, a mobile computing device, or any other electronic device or computing system capable of receiving, sending, and processing data. In other embodiments, server 110 can represent a server computing system utilizing multiple computers as a server system, such as in a cloud computing environment. In another embodiment, server 110 can be a laptop computer, a tablet computer, a netbook computer, a personal computer (PC), a desktop computer, a personal digital assistant (PDA), a smart phone, or any other programmable electronic device capable of communicating other computing devices (not shown) within display environment 100 via network 101. In another embodiment, server 110 represents a computing system utilizing clustered computers and components (e.g., database server computers, application server computers, etc.) that act as a single pool of seamless resources when accessed within display environment 100.

Embodiment of the present invention can reside on server 110. Server 110 includes display component 111 and database 116.

Display component 111 provides the capability of either avoiding or enhancing stroboscopic effect associated with video/still images by leveraging Generative Adversarial Network (GAN) technology. Furthermore, the use of Augmented Reality (AR) devices can be used to provide additional filter to the images.

A user case scenario will be used to illustrate display component 111 of the present invention. A video clip contains an image of a ceiling fan. The ceiling fan's speed is close to the same frequency as the ceiling light. Due to stroboscopic effect, the human eyes will perceive the moving object to be still. Image processing is done by a smart glass (i.e. AR goggle) will identify subtle frequency differences and continue capturing images at different point of time. After identifying the stroboscopic effect, the present embodiment generates a modified image using GAN.

Display component 111 has the following features and/or capability: (i) identify the context of the scene and modulate the visibility of moving object and background accordingly; (ii) augment the background of the stroboscopic effect creating object to be visible—user will experience the moving object to be transparent; (iii) make the moving object completely opaque to make the user aware of its presence—user will not get to see the background; and (iv) enhance or rectify the existing stroboscopic effect for better viewing experience—avoid scenarios like wagon wheel effect where optical illusion make things contradict the physical properties.

Some embodiments of display component 111 may include the following steps and/or features: (i) taking various IoT sensors data along with video as an input to generate the augmented video using generative adversarial network, (ii) encoding various spatio-temporal data into latent space using various temporal encoders, (iii) determining various factors such as environmental condition, user medical profile, lighting condition, frequency of light, rotating speed of the object, spatio-temporal object visibility score, etc., (iv) learning to reduce the amount of noise by combining multiple data sources along with controllable parameters, (v) taking a possible controllable parameter (e.g., enable/disable effects, enhance the resolution of the effects, negate the effects, merge/split effects for generating augmented video) by learning discriminator and generators using various loss functions. The loss function includes optical illusion loss, negate effect loss, merge/split effect loss, etc., (vi) the output of the from the prior step(s) could be integrated with augmented reality system to superimpose the GAN generated video as an additional layer and (vii) dynamically updating the model parameters and fine-tune the parameters based on the reward score provided by the user using reinforcement learning. The possible reward score provided at the effect level or labeling spatio-temporal video frames or marking the side effect of the stroboscopic effect. In general, "spatio-temporal data" corresponds to a data set that gives information about the space and time parameters involved in it. For example tracking the moving objects in the video or occupy a single position at a given time.

An example is provided below to illustrate the functionality of display component 111. Let consider a scenario where the frequency of moving object and the light is same (e.g., a ceiling fan). Due to stroboscopic effect, our naked eyes will perceive the moving object to be still. As a part of display component 111, image processing done by a smart glass will identify subtle frequency differences and continue capturing images at different point of time. After identifying the stroboscopic effect, display component 111 generates it using GAN and introduces it as per the expectation using AR (augmented reality) devices.

Database 116 is a repository for data used by display component 111. Database 116 can be implemented with any type of storage device capable of storing data and configuration files that can be accessed and utilized by server 110, such as a database server, a hard disk drive, or a flash memory. Database 116 uses one or more of a plurality of techniques known in the art to store a plurality of information. In the depicted embodiment, database 116 resides on server 110. In another embodiment, database 116 may reside elsewhere within display environment 100, provided that display component 111 has access to database 116. Database 116 may store information associated with, but is not limited to, knowledge corpus, training dataset, training models, libraries of images, feedback via RL (reinforcement learning), AR (augmented reality) display setting/profiles, VR display setting/profiles, display settings, loss functions, IoT device specifications including data interface and video editing techniques.

Figure 2:
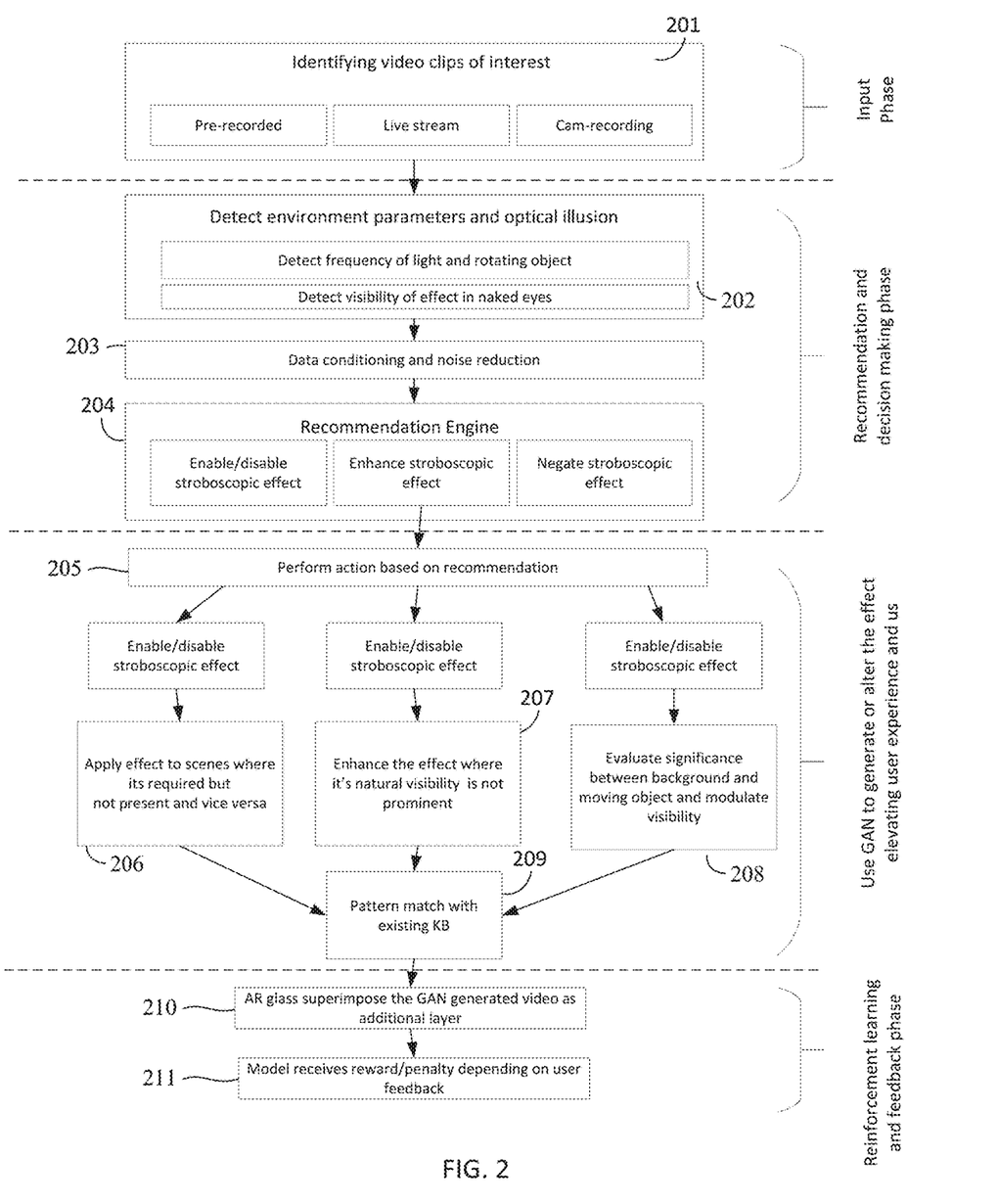
FIG. 2 is a functional block diagram illustrating high level general steps of display component 111, in accordance with one embodiment of the present invention.

FIG. 2 is a functional block diagram illustrating high-level general steps of display component 111, in accordance with one embodiment of the present invention. Block 201 illustrates the input phase by identifying video clips of interest. Block 201 leads into block 202. Block 202 illustrates the functionality of detecting environmental parameters and optical illusion. Within block 202, other features includes, (i) detect frequency of light and rotating objects and (ii) detect visibility of effect in naked eyes. Block 202 flows into block 203. Block 203 includes the feature of data condition and noise reduction of the video data (from block 201). Block 203 leads into a block 204, a recommendation engine. Block 204 has the following features as a recommendation engine, (i) enable/disable stroboscopic effect, (ii) enhance stereoscopic effect and (iii) negate stereoscopic effect. Based on the decision made by block 204, block 205 performs the recommended action(s). The recommended action can be described in block 206, block 207 and block 208. Block 206 denotes embodiment can apply effect to scenes where it's required but not present and vice versa. Block 207 denotes embodiment can enhance the effect where its natural visibility is not prominent and block 208 denotes embodiment can evaluate significance between the background and moving object and modulate visibility. All the decision blocks (e.g., 206, 207 and 208) lead to block 209, denoting pattern matches with existing knowledge base KB (Knowledge Base). The next phase after generating/altering the images is the RL (reinforcement learning) phase. Block 210 denotes the use of AR glasses to enhance the viewing of the altered images. Block 211 denotes the feedback from the user given back to the system for the future adjustments.

Figure 3:
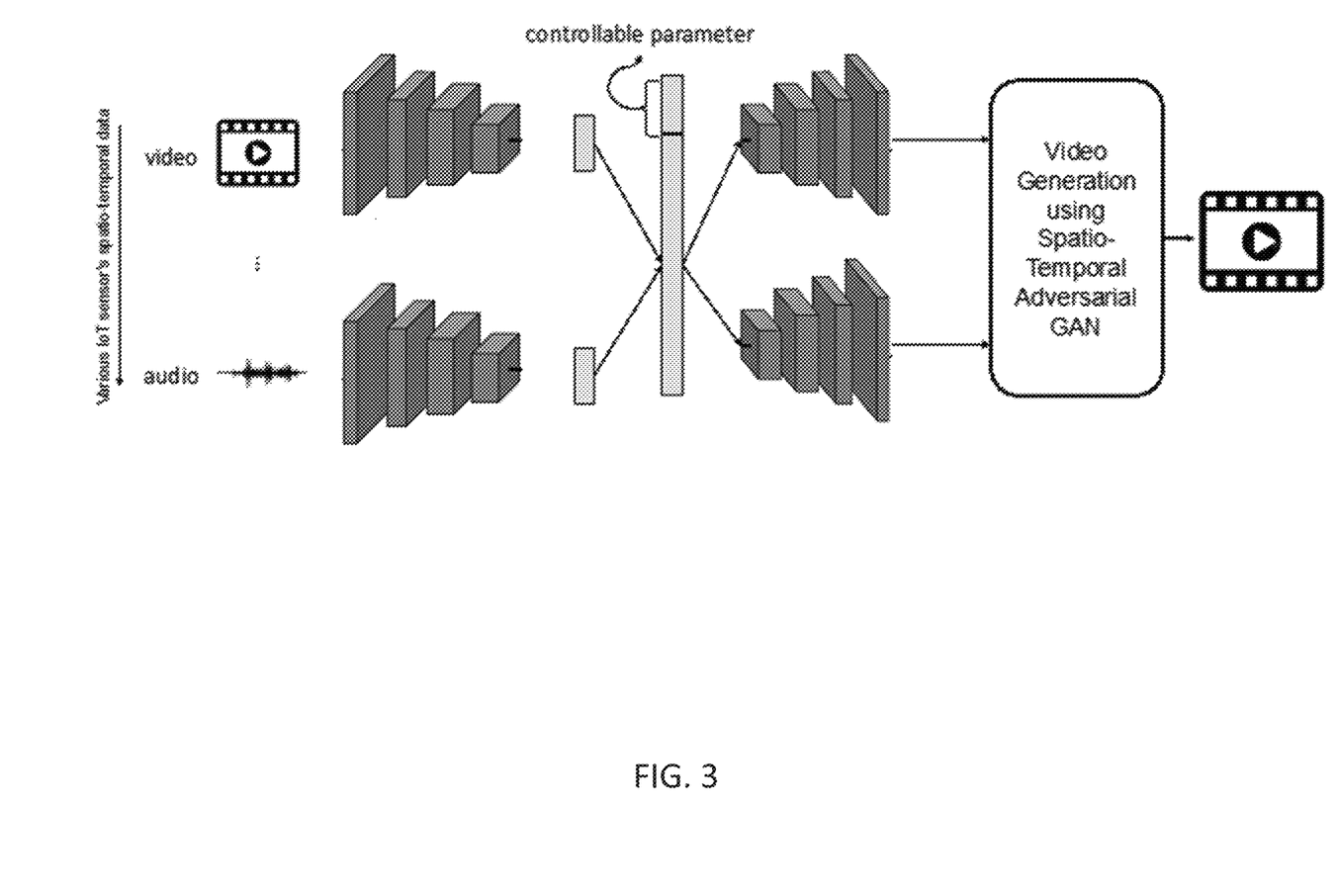
FIG. 3 is a diagram illustrating the video generation sequence associated with display environment 100, in accordance with one embodiment of the present invention.

FIG. 3 is a diagram illustrating the video generation sequence associated with display environment 100, in accordance with one embodiment of the present invention. Data from IoT devices 102 is combined with video data and then fed into a video generation component of a GAN system. The data collected by IoT devices can include personal user data along with environmental data. The user data can be related to user's medical profile (via wearable watch/sensors). The environmental data can be collected using light sensors, speed sensors, etc. which are mapped to environmental profile such lighting condition, frequency of light rotating speed of objects, etc. For example, an environmental condition/data is the amount of lighting in certain space. The intensity of the light is detected and feed into the system. It is noted that environmental parameters can be related to the controllable parameters. These are trained and learned by the model.

It is noted that the user have access to adjust controllable parameters. Controllable parameters includes, enable/disable effects, enhance the resolution of the effects, negate the effects, and merge/split effects for generating augmented video.

Figure 4:
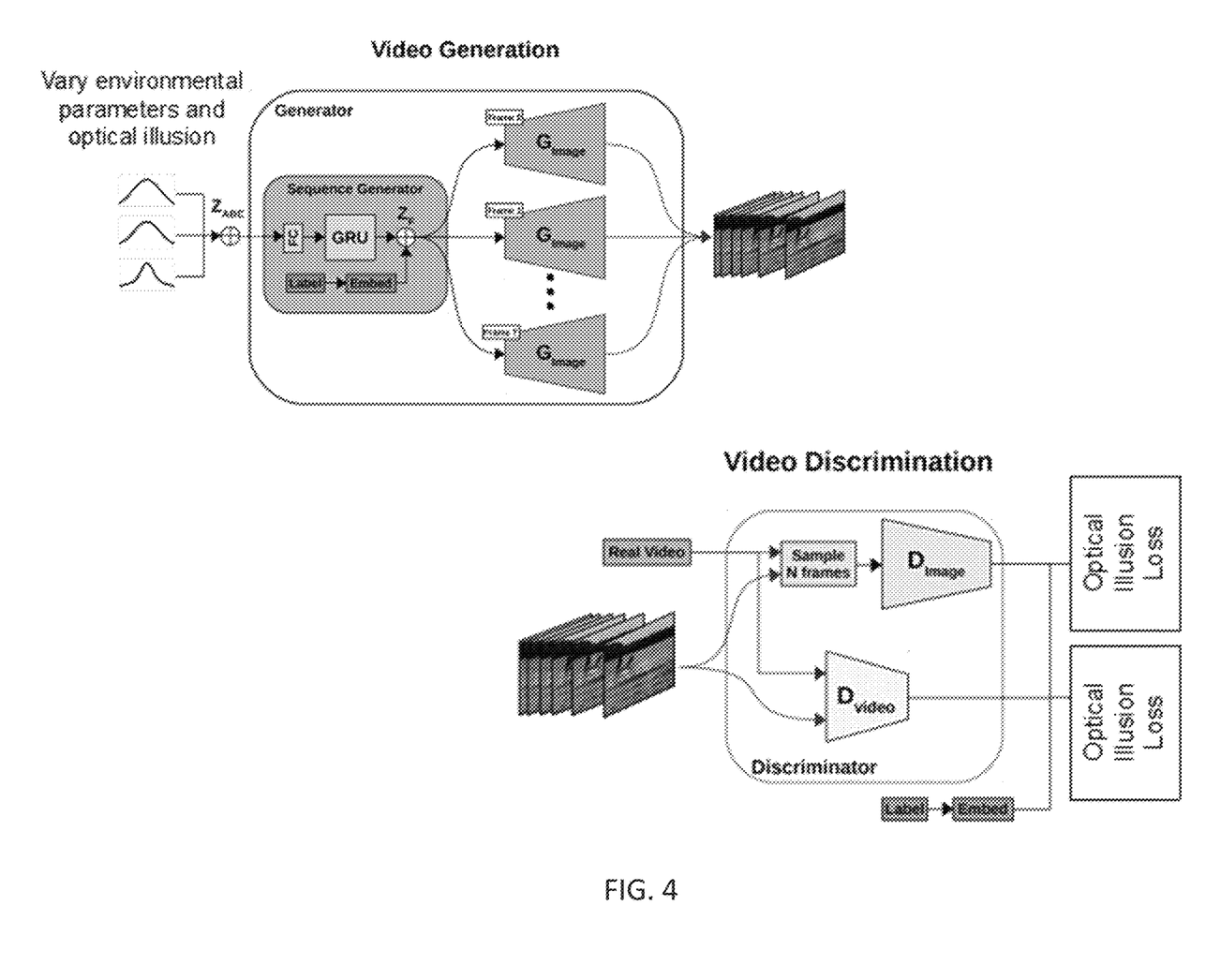
FIG. 4 is a diagram illustrating how display environment 100 captures optical illusion loss using video generator and video discriminator, in accordance with another embodiment of the present invention.

FIG. 4 is a diagram illustrating how display environment 100 captures optical illusion loss using video generator and video discriminator, in accordance with another embodiment of the present invention.

Figure 5:
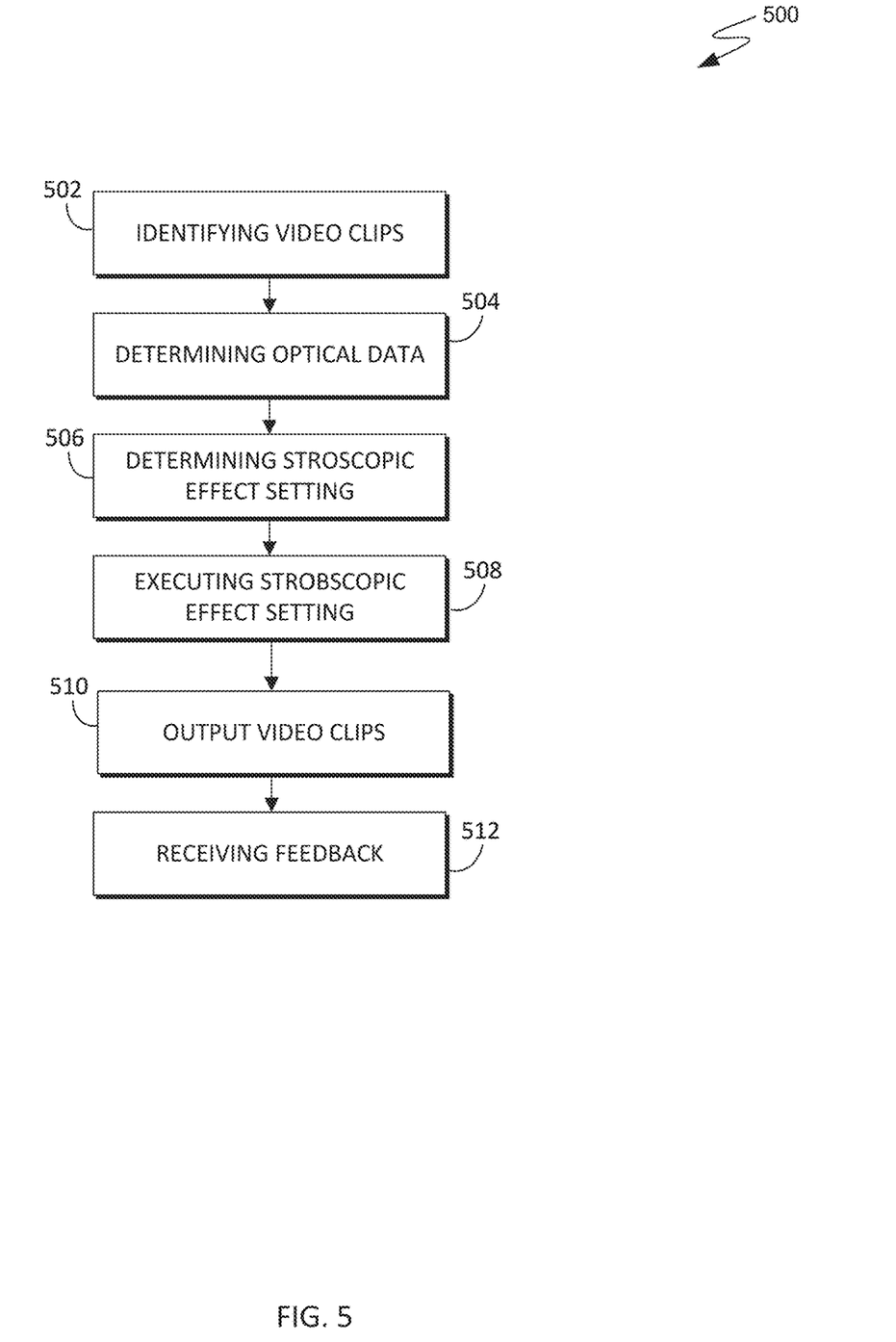
FIG. 5 is a high-level flowchart illustrating the operation of display component 111, designated as 500, in accordance with another embodiment of the present invention.

FIG. 5 is a high-level flowchart illustrating the operation of display component 111, designated as 500, in accordance with another embodiment of the present invention.

Display component 111 identifies one or more video clips (step 502). In an embodiment, display component 111, based on the selection from a user, chooses a video and/or still image (e.g., live stream, cam-recording, pre-recorded, etc.) to being the process of enhancing the viewing experience of the user. For example, the user selects a pre-recorded clip from video source 105 (i.e., file stored on a personal computer).

Display component 111 determines optical data (step 504). In an embodiment, display component 111, through machine learning and IoT devices, collects the optical data (includes environmental data and user data). Environmental conditions is collected using light sensors, speed sensors, etc. which are mapped to environmental profile such lighting condition, frequency of light rotating speed of objects, etc.

IoT devices 102 collects personal user data along with environmental data. The user data is related to user's medical profile using wearable sensors. Once all the optical data has been collected then the data is combined with the selected video clip. The selected video clip is encoded with spatio-temporal data into latent space using various temporal encoders. Spatio-temporal data can include tracking the moving objects in the video and occupy a single position at a given time.

Display component 111 determines stroboscopic effect setting (step 506). In an embodiment, display component 111 by leveraging AI (machine learning), determines optimal recommendation (for stroboscopic effect setting) based on various factors. For example, the factors can include environmental condition, user medical profile, lighting condition, frequency of light, rotating speed of the object, spatio-temporal object visibility score, etc.

Thus, based on the various factors, display component 111 can make optimal (unique to the user/viewer) recommendations, such as, (i) enable/disable stroboscopic effect, (ii) enhance stereoscopic effect and (iii) negate stereoscopic effect.

In some embodiments, display component 111 can learn to reduce the amount of noise by combining multiple data sources along with controllable parameters.

Display component 111 executes stroboscopic effecting setting (step 508). In an embodiment, display component 111, initiates the recommendation setting from the prior steps. Display component 111 uses the recommended setting to generate augmented video by learning discriminator and generators (via GAN) using various loss functions. The loss function includes optical illusion loss, negate effect loss, merge/split effect loss, etc. For example, if the recommendation was to enable the stroboscopic effect, then the system will perform the action.

Display component 111 outputs the video clips (step 510). In an embodiment, display component 111 outputting the video clips based on the updated the stroboscopic effecting setting to a display. For example, the output can be integrated with an (AR) augmented reality system (i.e., 103) to superimpose the GAN generated video as an additional layer.

Display component 111 receives feedback from the user (step 512). In an embodiment, display component 111 can dynamically update the model parameters and fine-tune the parameters based on the reward score provided by the user using reinforcement learning. The possible reward score provided at the effect level or labeling spatio-temporal video frames or marking the side effect of the stroboscopic effect.

Figure 6:
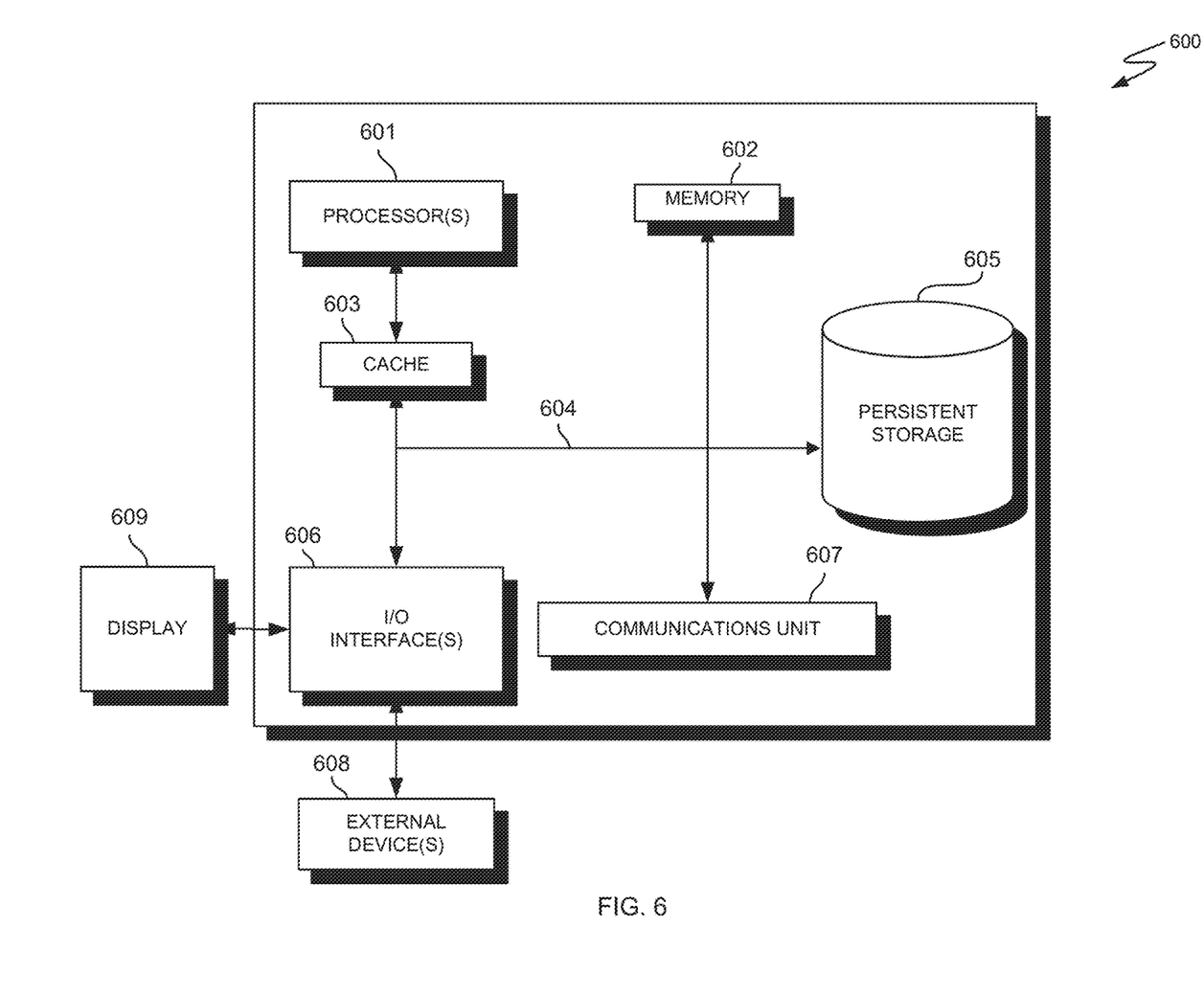
FIG. 6 depicts a block diagram, designated as 600, of components of a server computer capable of executing the display component 111 within the display environment 100, in accordance with an embodiment of the present invention.

FIG. 6, designated as 600, depicts a block diagram of components of display component 111 application, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

FIG. 6 includes processor(s) 601, cache 603, memory 602, persistent storage 605, communications unit 607, input/output (I/O) interface(s) 606, and communications fabric 604. Communications fabric 604 provides communications between cache 603, memory 602, persistent storage 605, communications unit 607, and input/output (I/O) interface(s) 606. Communications fabric 604 can be implemented with any architecture designed for passing data and/or control information between processors (such as microprocessors, communications and network processors, etc.), system memory, peripheral devices, and any other hardware components within a system. For example, communications fabric 604 can be implemented with one or more buses or a crossbar switch.

Memory 602 and persistent storage 605 are computer readable storage media. In this embodiment, memory 602 includes random access memory (RAM). In general, memory 602 can include any suitable volatile or non-volatile computer readable storage media. Cache 603 is a fast memory that enhances the performance of processor(s) 601 by holding recently accessed data, and data near recently accessed data, from memory 602.

Program instructions and data (e.g., software and data x10) used to practice embodiments of the present invention may be stored in persistent storage 605 and in memory 602 for execution by one or more of the respective processor(s) 601 via cache 603. In an embodiment, persistent storage 605 includes a magnetic hard disk drive. Alternatively, or in addition to a magnetic hard disk drive, persistent storage 605 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 605 may also be removable. For example, a removable hard drive may be used for persistent storage 605. Other examples include optical and magnetic disks, thumb drives, and smart cards that are inserted into a drive for transfer onto another computer readable storage medium that is also part of persistent storage 605. Display component 111 can be stored in persistent storage 605 for access and/or execution by one or more of the respective processor(s) 601 via cache 603.

Communications unit 607, in these examples, provides for communications with other data processing systems or devices. In these examples, communications unit 607 includes one or more network interface cards. Communications unit 607 may provide communications through the use of either or both physical and wireless communications links. Program instructions and data (e.g., Display component 111) used to practice embodiments of the present invention may be downloaded to persistent storage 605 through communications unit 607.

I/O interface(s) 606 allows for input and output of data with other devices that may be connected to each computer system. For example, I/O interface(s) 606 may provide a connection to external device(s) 608, such as a keyboard, a keypad, a touch screen, and/or some other suitable input device. External device(s) 608 can also include portable computer readable storage media, such as, for example, thumb drives, portable optical or magnetic disks, and memory cards. Program instructions and data (e.g., Display component 111) used to practice embodiments of the present invention can be stored on such portable computer readable storage media and can be loaded onto persistent storage 605 via I/O interface(s) 606. I/O interface(s) 606 also connect to display 609.

Display 609 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

Finally, the proposed concept may be summarized in a nutshell in the following clauses:

1) The AI system takes a various IoT sensors data along with video as an input to generate the augmented video using generative adversarial network.
2) The AI system encodes various spatio-temporal data into latent space using various temporal encoders.
3) The proposed AI system determines various factors such as environmental condition, user medical profile, lighting condition, frequency of light, rotating speed of the object, spatio-temporal object visibility score, etc.
4) The proposed AI system learns to reduce the amount of noise by combining multiple data sources along with controllable parameters.
5) The proposed AI take a possible controllable parameter such as enable/disable effects, enhance the resolution of the effects, negate the effects, merge/split effects for generating augmented video by learning discriminator and generators using various loss functions. The loss function includes optical illusion loss, negate effect loss, merge/split effect loss, etc.
6) The output of the proposed system could be integrated with augmented reality system to superimpose the GAN generated video as an additional layer.
7) The proposed system dynamically updates the model parameters and fine-tune the parameters based on the reward score provided by the user using reinforcement learning. The possible reward score provided at the effect level or labeling spatio-temporal video frames or marking the side effect of the stroboscopic effect.

What is claimed is:

1. A computer-implemented method for modifying in real-time stroboscopic effect, by leveraging machine learning, from one or more video clips, the computer-method comprising:
   identifying the one or more video clips from a user;
   receiving IoT (Internet of Things) data from one or more IoT devices;
   determining an optical data based on the IoT data and the user;
   determining a stroboscopic effect setting based on the optical data and factors and wherein the factors further comprise of, environmental condition, user medical profile, lighting condition, frequency of light, rotating speed of the object and spatio-temporal object visibility score;
   executing the stroboscopic effect setting on the one or more video clips;
   outputting the video clips based on the updated the stroboscopic effecting setting; and
   receiving one or more feedbacks from the user.

2. The computer-implemented method of claim 1, wherein determining optical data further comprising:
   collecting the optical data, wherein optical data includes environmental data and user data; and
   encoding optical data into latent space.

3. The computer-implemented method of claim 1, wherein stroboscopic effect setting further comprises, enabling/disabling stroboscopic effect, enhancing stereoscopic effect and negating stereoscopic effect.

4. The computer-implemented method of claim 3 wherein enabling/disabling stroboscopic effect, enhancing stereoscopic effect or negating stereoscopic effect further comprises, (i) modulating visibility of moving objects and background simultaneously, (ii) augmenting the background and adding transparency, (iii) making the moving object opaque and distinguishing it with respect to the background, (iv) controlling of the stroboscopic effect using light source, (v) making the moving object opaque and distinguishing it with respect to the background, (vi) augmenting the background and adding transparency, (vii) changing the movement of the objects in the video.

5. The computer-implemented method of claim 1, wherein executing stroboscopic effecting setting on the one or more video clips further comprises:

generating an augmented video by learning discriminator and generators using various loss functions.

6. The computer-implemented method of claim 1, wherein outputting the video clips based on the updated the stroboscopic effecting setting further comprises:
superimposing a GAN (generative adversarial network) generated video as an additional layer with an (AR) augmented reality system.

7. The computer-implemented method of claim 1, wherein receiving feedback from user further comprises:
updating model parameters; and
fine-tuning the model parameters based on the reward score provided by the user using reinforcement learning.

8. A computer program product for modifying in real-time stroboscopic effect from one or more video clips, the computer program product comprising:
one or more computer readable storage media and program instructions stored on the one or more computer readable storage media, the program instructions, executable by one or more computer processors, comprising:
program instructions to the one or more video clips from a user;
program instructions to receive IoT (Internet of Things) data from one or more IoT devices;
program instructions to determine an optical data based on the IoT data and the user;
program instructions to determine a stroboscopic effect setting based on the optical data and factors and wherein the factors further comprises of, environmental condition, user medical profile, lighting condition, frequency of light, rotating speed of the object and spatio-temporal object visibility score;
program instructions to execute stroboscopic effect setting on the one or more video clips;
program instructions to output the video clips based on the updated the stroboscopic effecting setting; and
program instructions to receive one or more feedbacks from the user.

9. The computer program product of claim 8, wherein program instructions to determine optical data further comprising:
program instructions to collect the optical data, wherein optical data includes environmental data and user data; and
program instructions to encode optical data into latent space.

10. The computer program product of claim 8, wherein stroboscopic effect setting further comprises, enabling/disabling stroboscopic effect, enhancing stereoscopic effect and negating stereoscopic effect.

11. The computer program product of claim 10, wherein enabling/disabling stroboscopic effect, enhancing stereoscopic effect or negating stereoscopic effect further comprises, (i) modulating visibility of moving objects and background simultaneously, (ii) augmenting the background and adding transparency, (iii) making the moving object opaque and distinguishing it with respect to the background, (iv) controlling of the stroboscopic effect using light source, (v) making the moving object opaque and distinguishing it with respect to the background, (vi) augmenting the background and adding transparency, (vii) changing the movement of the objects in the video.

12. The computer program product of claim 8, wherein program instructions to execute stroboscopic effecting setting on the one or more video clips further comprises:
program instructions to generate an augmented video by learning discriminator and generators using various loss functions.

13. The computer program product of claim 8, wherein program instructions to output the video clips based on the updated the stroboscopic effecting setting further comprises:
program instructions to superimpose a GAN (generative adversarial network) generated video as an additional layer with an (AR) augmented reality system.

14. The computer program product of claim 8, wherein program instructions to receiving feedback from user further comprises:
program instructions to update model parameters; and
program instructions to fine-tune the model parameters based on the reward score provided by the user using reinforcement learning.

15. A computer system for modifying in real-time stroboscopic effect from one or more video clips, the computer system comprising:
one or more computer processors;
one or more computer readable storage media; and
program instructions stored on the one or more computer readable storage media for execution by at least one of the one or more computer processors, the program instructions comprising:
program instructions to the one or more video clips from a user;
program instructions to receive IoT (Internet of Things) data from one or more IoT devices;
program instructions to determine an optical data based on the IoT data and the user;
program instructions to determine a stroboscopic effect setting based on the optical data and factors and wherein the factors further comprises of, environmental condition, user medical profile, lighting condition, frequency of light, rotating speed of the object and spatio-temporal object visibility score;
program instructions to execute stroboscopic effect setting on the one or more video clips;
program instructions to output the video clips based on the updated the stroboscopic effecting setting; and
program instructions to receive one or more feedbacks from the user.

16. The computer system of claim 15, wherein program instructions to determine optical data further comprising:
program instructions to collect the optical data, wherein optical data includes environmental data and user data; and
program instructions to encode optical data into latent space.

17. The computer system of claim 15, wherein stroboscopic effect setting further comprises, enabling/disabling stroboscopic effect, enhancing stereoscopic effect and negating stereoscopic effect.

18. The computer system of claim 17, wherein enabling/disabling stroboscopic effect, enhancing stereoscopic effect or negating stereoscopic effect further comprises, (i) modulating visibility of moving objects and background simultaneously, (ii) augmenting the background and adding transparency, (iii) making the moving object opaque and distinguishing it with respect to the background, (iv) controlling of the stroboscopic effect using light source, (v) making the moving object opaque and distinguishing it with respect to the background, (vi) augmenting the background and adding transparency, (vii) changing the movement of the objects in the video.

19. The computer system of claim 15, wherein program instructions to execute stroboscopic effecting setting on the one or more video clips further comprises:
 program instructions to generate an augmented video by learning discriminator and generators using various loss functions.

20. The computer system of claim 15, wherein program instructions to output the video clips based on the updated the stroboscopic effecting setting further comprises:
 program instructions to superimpose a GAN (generative adversarial network) generated video as an additional layer with an (AR) augmented reality system.

* * * * *